United States Patent [19]

Sudbrack et al.

[11] Patent Number: 4,627,341

[45] Date of Patent: Dec. 9, 1986

[54] BALE DENSITY CONTROL SENSING APPARATUS AND METHOD

[75] Inventors: Cecil R. Sudbrack; Linwood H. Bowen, both of New Holland, Pa.; Donald O. Bigelow, Webster, N.Y.

[73] Assignee: New Holland, Inc., New Holland, Pa.

[21] Appl. No.: 773,471

[22] Filed: Sep. 6, 1985

[51] Int. Cl.⁴ .............................................. B30B 15/26
[52] U.S. Cl. ...................................... 100/41; 100/43; 100/191
[58] Field of Search ..................... 100/35, 41, 43, 191, 100/192, 189; 56/341

[56] References Cited

U.S. PATENT DOCUMENTS

| | | | |
|---|---|---|---|
| 4,037,528 | 7/1977 | White | 100/191 |
| 4,118,918 | 10/1978 | White | 56/341 |
| 4,125,071 | 11/1978 | Young | 100/191 |
| 4,132,163 | 1/1979 | White | 100/42 |
| 4,168,659 | 9/1979 | Yatcilla et al. | 100/43 |
| 4,184,312 | 1/1980 | Oosterling et al. | 56/341 |
| 4,275,550 | 6/1981 | Swenson et al. | 56/341 |
| 4,280,403 | 7/1981 | Alderson | 100/43 |
| 4,489,648 | 12/1984 | Naaktgeboren | 100/191 |
| 4,514,968 | 5/1985 | Underhill | 56/341 |
| 4,525,991 | 7/1985 | Naaktgeboren | 56/341 |

*Primary Examiner*—Billy J. Wilhite
*Attorney, Agent, or Firm*—Griffin, Branigan & Butler

[57] ABSTRACT

In a bale case (20) of an agricultural baler, a reciprocating plunger (71) is connected by a connecting rod assembly (90) and a wrist pin (92) to a driving crankshaft (74). A tension adjusting system (60) is provided for adjusting the dimensions of a bale case (20). The tension adjusting system (60) is responsive to a signal produced by sensors which sense stress when a compactive force is applied by the plunger (71) to crop material in the bale case (20). In one embodiment shear stress sensors (124, 126, 128, and 130) are mounted in annular recesses (120, 122) on the exterior of a wrist pin (92) to sense upon compaction the shear stress experienced by the wrist pin (92) in shear planes (160A, 160B). In another embodiment shear stress sensors (170, 171, 172, and 173) are mounted on an interior surface (174) of a wrist pin (90') to sense the shear stress experienced by the wrist pin (92') in shear planes (176, 177). In an another embodiment, bending stress sensors (182, 183, 184 and 185) are mounted on chordal flat portions (180 and 181) of a wrist pin (92") to sense upon compaction the bending stress experienced by the wrist pin (92") in a bending plane. In another embodiment, a load cell (190) with stress sensors (194, 195) mounted thereon is mounted between a connecting rod plate (98) and a connecting rod bearing housing (102).

33 Claims, 13 Drawing Figures

BALE DENSITY CONTROL SENSING APPARATUS AND METHOD

BACKGROUND

1. Field of The Invention

The present invention relates generally to agricultural balers and, in particular, to density control methods and apparatus for such balers.

II. Prior Art and Other Considerations

Agricultural balers have a bale case into which crop or silage material is introduced. The bale case, generally of a rectangular shape, is defined by rails which determine the height and width of the bale case. A plunger is reciprocably disposed in a forward portion of the bale case to form crop material into rectangular bales These rectangular bales are pushed through a rearward portion of the bale case where they are bound in a conventional manner with suitable material such as twine before being discharged from the baler In the baler art it is known that bale density may be controlled by changing the position of one or more of the rails defining the bale case. Numerous types of mechanisms have been provided for performing this function such as those shown in U.S. Pat. Nos. 4,125,071; 4,037,528; and 4,489,648. In various ones of these known mechanisms tensioning systems comprising hydraulic cylinders are actuated to change the position of the bale case rails.

Various prior art methods exist for controlling the actuation of the hydraulic cylinders and for thereby changing the position of the bale case rails in order to control the density of the material being baled therein. According to some prior art practices mechanical sensors attempt to penetrate a forming bale and determine whether the hydraulic cylinders are to be either further pressurized or depressurized. According to another prior art practice disclosed in U.S. Pat. Nos. 4,168,659 and 4,280,403, an attempt is made to keep the plunger operating at a constant compactive force regardless of variations in crop conditions by mechanically linking the plunger with a hydraulic pump. The linkage is effected in a manner whereby, with each compaction stroke of the piston, the pump routes additional pressure to a hydraulic circuit and to the hydraulic cylinders until a sufficient pressure level is reached in the hydraulic circuit. Careful and critical calibrations are required with respect to the hydraulic circuit in order to accommodate such prior art devices for the handling of different types of baled materials or the baling of materials under changing conditions In view of the foregoing, it is an object of the present invention to provide a method and apparatus for accurately and effectively controlling the density of baled material.

An advantage of the present invention is the provision of method and apparatus wherein the density of baled material is controlled by directly sensing the stress on mechanical elements employed in compacting the bale.

A further advantage of the present invention is the provision of method and apparatus for controlling the density of baled material without tedious calibration.

SUMMARY

In a bale case of an agricultural baler, a reciprocating plunger is connected by a connecting rod assembly and a wrist pin to a driving crankshaft. A tension adjusting system is provided for adjusting the dimensions of a bale case. The tension adjusting system is responsive to a signal produced by sensors which sense stress when a compactive force is applied by the plunger to crop material in the bale case. In one embodiment shear stress sensors are mounted in annular recesses on the exterior of a wrist pin to sense upon compaction the shear stress experienced by the wrist pin in shear planes. In another embodiment shear stress sensors are mounted on an interior surface of a wrist pin to sense the shear stress experienced by the wrist pin in shear planes. In another embodiment, bending stress sensors are mounted on a chordal flat portion of a wrist pin to sense upon compaction the bending stress experienced by the wrist pin in bending plane. In another embodiment, a load cell with stress sensors mounted thereon is mounted between a connecting rod plate and a connecting rod bearing housing.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
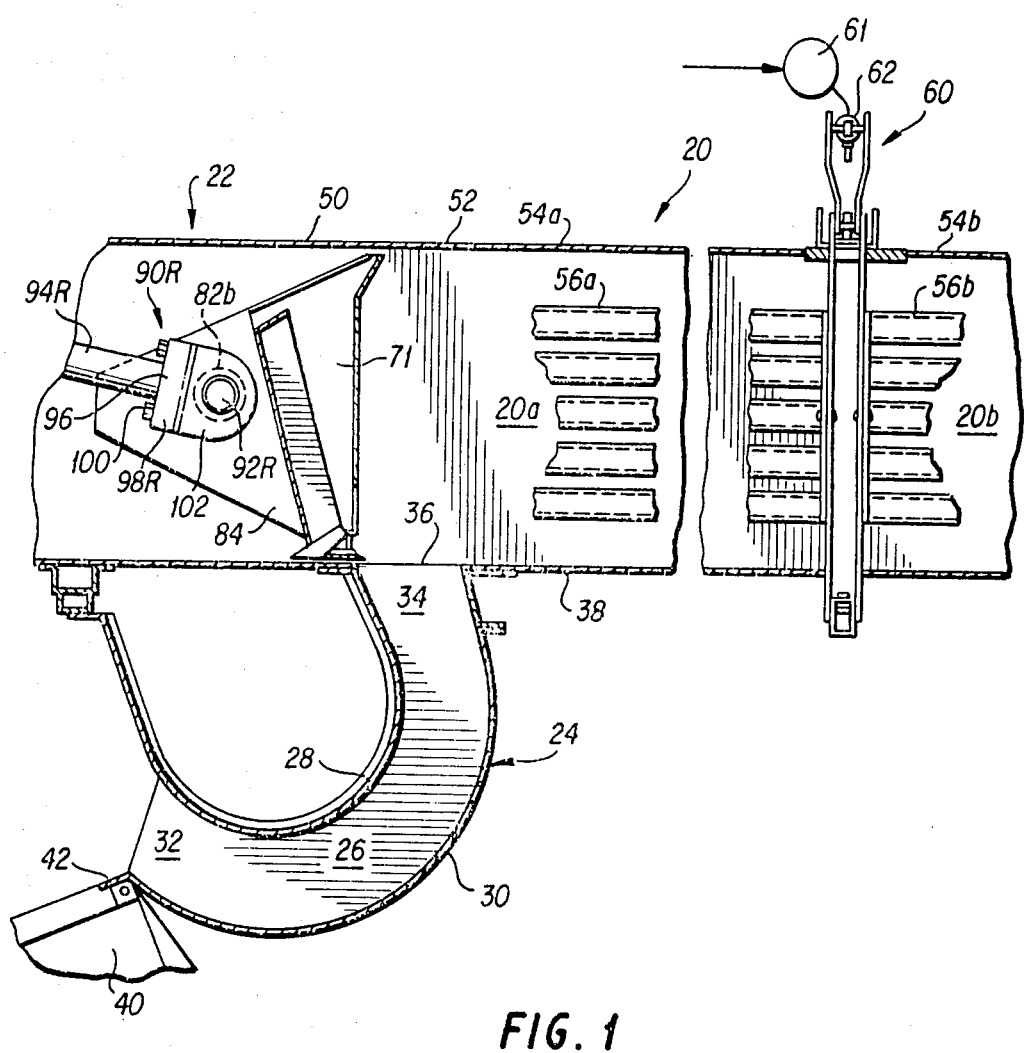
FIG. 1 is a partially sectioned side view of a portion of an agricultural baling apparatus according to an embodiment of the invention which shows a portion of a bale case with a plunger disposed at a forward end thereof.

FIG. 1 shows a portion of an agricultural baling machine which comprises a bale case 20, a portion of which is shown in FIG. 1. Although not shown herein, it is understood that the bale case 20 is mounted on a frame which is supported by wheels. A tongue extends forwardly from the bale case 20 for attachment to a tractor (also not shown). A plunger assembly 22 is reciprocably disposed in the bale case to form crop material into rectangular bales.

A feed chamber 24 is mounted underneath the bale case 20 and includes a curved duct 26 having top and bottom walls 28 and 30, respectively, and sidewalls. The curved duct 26 is open at its lower end 32 and communicates at its upper end 34 with an inlet opening 36 formed in a bottom wall 38 of the bale case 20. A pickup device 40 of a conventional type is partially shown in FIG. 1 as being pivotally connected at 42 to the feed chamber 24. The pickup device 40 includes a plurality of fingers which are rotatable for lifting crop material from the ground and delivering it toward the feed chamber 24. The details of one suitable type of feed chamber and feed mechanisms provided therein are understood from U.S. Pat. No. 4,525,991 to Naaktgeboren which is incorporated herein by reference.

The bale case 20 has a forward portion 50 (in which the plunger assembly 22 is reciprocably disposed) and a rearward portion 52 (in which are provided bale case areas 20a and 20b). The bale case 20 is comprised of a top rail (including top rail sections 54a and 54b); siderails (including siderail sections 56a and 56b); and, a bottom rail or bottom wall 38.

A tension adjusting system 60 is provided for changing the position of the first and second sections 54a, 54b of the top rail and for changing the positions of the first and second sections 56a, 56b of the siderails to adjust the dimensions of the chamber areas 20a and 20b of the bale case rearward portion 52 to thereby adjust bale density. The tension adjusting system 60 comprises a servo valve 61; a hydraulic cylinder unit 62; and mechanical tensioning elements. In the illustrated embodiment the servo valve 61 is a current-controlled pressure valve such as model PPC84600CF marketed by FEMA Corporation.

The tension adjusting system 60 is utilized to govern the degree of resistance provided by the bale case 20 to movement of crop material therein in order to adjust bale density, which may have the effect of changing the height and width of the bale case chamber areas 20a and 20b in appropriate circumstances. For example, by contracting the hydraulic cylinder unit 62, the bale case chamber areas 20a and 20b can, in appropriate circumstances, be reduced in height and width, thereby usually resulting in higher bale density. Conversely, by extending the hydraulic cylinder unit 62, the bale case chamber areas 20a and 20b can, in appropriate circumstances, be enlarged in height and width, thereby usually resulting in lower bale density. The details of one suitable type of mechanical tensioning elements comprising the tension adjusting system 60 are understood from U.S. Pat. No. 4,489,648 to Naaktgboren which is incorporated herein by reference, it being understood that other suitable types of mechanical tensioning elements can also be used.

Figure 2:
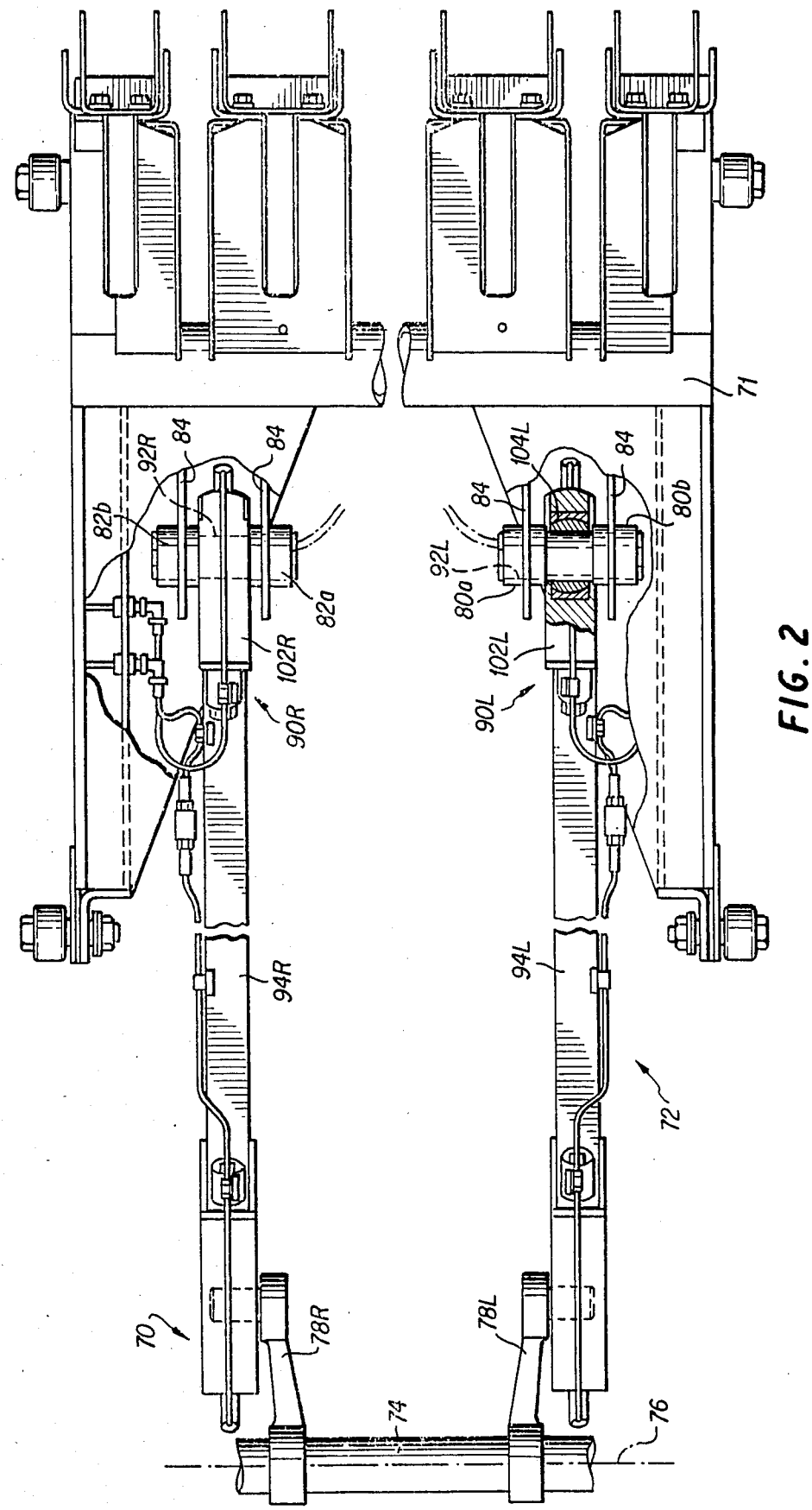
FIG. 2 is a top view, partially sectioned, of a portion of a bale case plunger assembly and portions of associated plunger driving means according to an embodiment of the invention.

FIG. 2 shows elements included in the forward portion of the bale case 50, including a portion of the plunger assembly 22 and plunger driving means 70. As used herein the plunger assembly includes a plunger element 71 and connecting means 72 for connecting the plunger element 71 to the plunger driving means 70.

The plunger driving means 70 comprises a crankshaft 74 (having a major axis 76) and left and right cranks 78L, 78R, respectively, connected to crankshaft 74 to be driven in phase with one another. Although not shown herein, it is understood that the crankshaft 74 is ultimately connected through a chain drive to a reduction gear box. Power from the PTO is transmitted through gearing in the reduction gear box and the chain drive to the crankshaft 74.

The plunger element 71 has two pairs of hubs mounted on a forward side thereof (that is, the side of the plunger element which does not contact the crop material). In this regard, a left hub pair 80a, 80b is provided on the left side of the plunger element 71 and a right hub pair 82a, 82b is provided on the right side of the plunger element 71. Each hub is essentially a hollow cylinder mounted inter alia by member 84 on the forward side of the plunger element 71.

The connecting means 72 comprises left and right connecting rod assemblies (also known as conrods) 90L, 90R, respectively, and left and right wrist pins 92L, 92R, respectively. Each connecting rod assembly 90 has a first end connected to the plunger drive means 70 and a second end connected to its respective wrist pin 92. In this respect, the first end of each connecting rod assembly 90 is connected to its respective crank 78 by a suitable bearing (not shown). The second end at each connecting rod assembly 90 comprises a weld assembly at which an elongated connecting rod 94 is welded (at 96) to a plate 98. Plate 98 is secured by fasteners 100 to a bearing housing 102. The bearing housing 102 has a bearing 104 therein adapted to centrally receive an intermediate portion of the respective wrist pin 92.

Figure 3A:
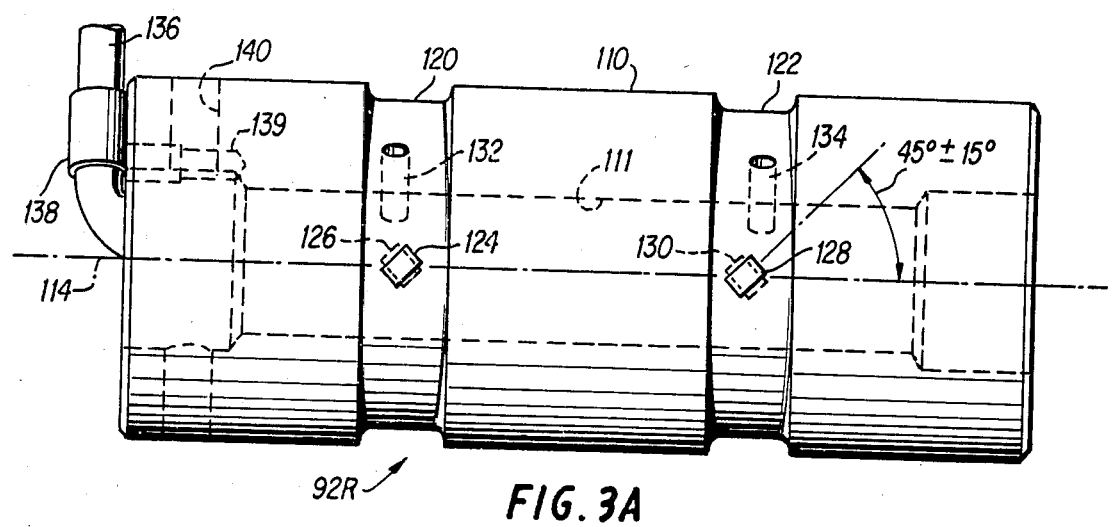
FIG. 3A is a top view of a wrist pin according to an embodiment of the invention wherein shear stress sensors are mounted on an exterior surface of the wrist pin.
Figure 3B:
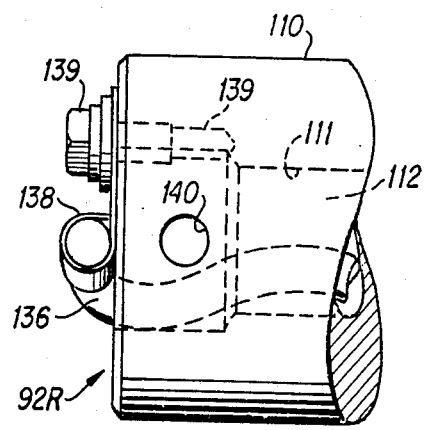
FIG. 3B is a front view of a portion of the wrist pin of FIG. 3A.
Figure 3C:
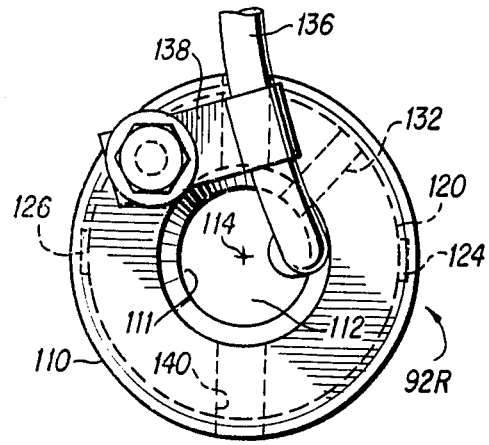
FIG. 3C is an end view of the wrist pin of FIG. 3A.

FIGS. 3A, 3B, 3C and 5 show an embodiment of a wrist pin 92 having sensors mounted thereon in two shear planes. Wrist pin 92 is essentially a hollow cylinder with an exterior cylindrical surface 110 and an interior cylindrical surface 111 which defines a hollow, essentially cylindrical cavity 112. The wrist pin 92 has a major axis 114 as shown in FIG. 3A.

Shear stress sensor means is mounted on each wrist pin 92. Two essentially annular recesses or channels 120 and 122 are formed on the exterior surface 110 of each wrist pin 92. In each annular recess 120, 122 two shear stress sensors such as strain gages are mounted essentially 180 degrees apart about the major axis 114. In this respect, in annular recess 120 a strain gage 124 is mounted on the front of wrist pin 92 and strain gage 126 on the back of wrist pin 92. Strain gages 128 and 130 are mounted in similar manner in annular recess 122. The strain gages 124, 126, 128, and 130 function together and are hereinafter referred to collectively as a load cell 131. Thus, a left load cell 131L is provided on wrist pin 92L and a right load cell 131R is provided on right wrist pin 92R.

Figure 5:
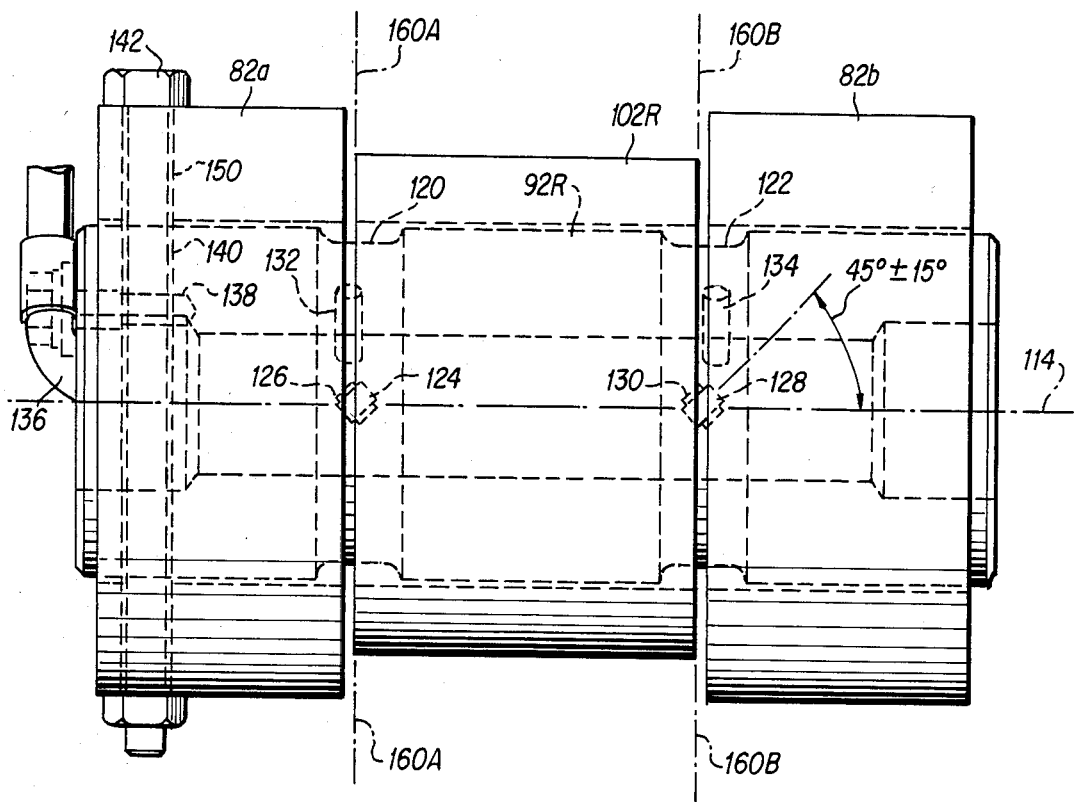
FIG. 5 is a top view showing a wrist pin of the embodiment of FIG. 3A engaged between plunger hubs and having a connecting rod bearing housing disposed thereabout.

The strain gages 124, 126, 128, and 130 shown in the embodiment of FIGS. 3 and 5 are strain gages such as model EA-06-125DW-120 manufactured by Micro-Measurements Division of Measurements Group. Accordingly, the grid pattern of these strain gages has to be oriented at 45 degrees with respect to the major axis 114 of the wrist pin 92 and at 90 degrees with respect to one another. It should be understood, however, that in other embodiments other types of strain gages are usable so long as they are mounted properly.

In the vicinity of the annular recesses 120, 122 radial passageways 132, 134, respectively, are provided whereby cavity 112 communicates with the annular recesses 120, 122, respectively. The passageways 132, 134 accommodate electrical lines which are connected to the strain gages 124, 126, 128, and 130, respectively. Near an end of the wrist pin 92 a cable 136 carries the electrical lines to suitable input (drive) circuitry and suitable output (signal take off) circuitry. Cable 136 is clamped to the end of the wrist 92 by a bracket 138 and a fastener 139.

Near one end thereof the wrist pin 92 has a bore 140 extending through its diameter. As explained hereinafter, bore 140 receives a fastener 142 for locking the wrist pin 92 between its two associated plunger hubs.

FIG. 5 shows how a wrist pin 92 is mounted to the plunger 22. In assembly, the bearing housing 102 of the connecting rod assembly 90 is positioned between the hubs of the plunger hub pair in a manner wherein the axial center of the bearing 104 is colinear with the axial center of the hub pair. The wrist pin 92 is then slid in the axial direction through the first hub 82a, through the center of the bearing housing 102R, and through the center of the second hub 82b. One of the hubs (i.e., hub 82a) has a bore 150 cross-drilled therein in a manner whereby the threaded fastener 142 can be received through the bore 150 and through the bore 140 in the wrist pin 92 to thereby lock the wrist pin 92 between the hubs 82a and 82b. Thus, the bearing housing 102R is pivotable about the wrist pin 92, but the wrist pin 92 is held stationary between the hubs 82a, 82b. Although the foregoing description of the assembly deals only with the right hub pair 82, it is understood that the assembly with respect to the left hub pair is analogous.

As shown in FIG. 5, the side edges of the second end of the connecting rod assembly 90, particularly bearing housing 102, form respective planes 160A, 160B which are perpendicular to the major axis 114 of the wrist pin 92. The planes 160A, 160B (which extend out of the sheet of FIG. 5) pass through respective annular recesses 120, 122 and in particular pass through the recesses 120, 122 in a manner whereby both the frontwardly and rearwardly disposed strain gages mounted in each annular recess lie in respective planes 160A, 160B. In this respect, strain gages 124 and 126 lie in plane 160A while strain gages 128 and 130 lie in plane 160B. The planes 160A, 160B are shear planes in which shear stress is experienced by the wrist pin 92 during application of compactive force by plunger 92 on crop material in the bale case 20.

Figure 4:
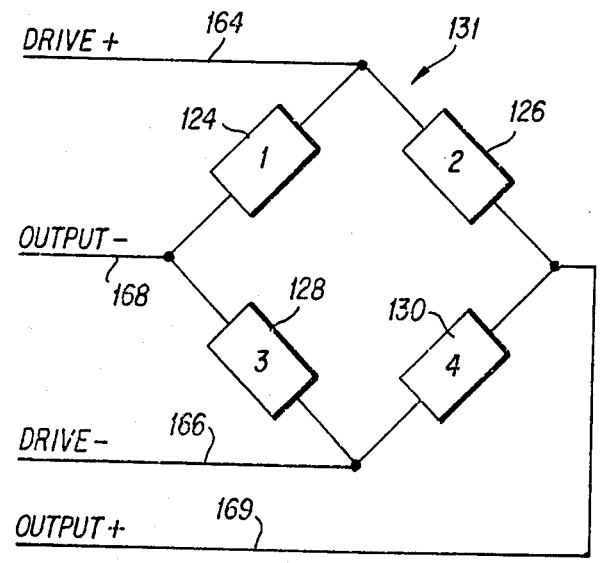
FIG. 4 is a schematic diagram showing the electrical connection of sensors utilized in an embodiment of the invention.

FIG. 4 shows a bridge configuration in which the strain gages 124, 126, 128, and 130 comprising the load cell 131 are connected. Strain gages 124 and 126 are connected to have a common positive phase drive signal applied on a line 164 to their respective input terminals. Likewise, the input terminals of strain gages 128 and 130 are connected together whereby a common negative phase drive signal is applied thereto on line 166. The output terminals of the strain gages 124 and 128 are connected together into a negative phase output line 168. The output terminals of the strain gages 126 and 130 are connected together into a positive phase output line 169. Electrical output signals indicative of the sensed stress are sensed by the strain gages connected in the bridge configuration of FIG. 4 and applied to the output lines.

In the above regard, it is understood that two such bridge circuits are provided, one for the left load cell 131L and one for the right load cell 131R. Accordingly, the left load cell 131L has drive lines 164L, 166L and output lines 168L, 169L; the right load cell has drive lines 164R, 166R and output lines 168R, 169R.

Figure 6A:
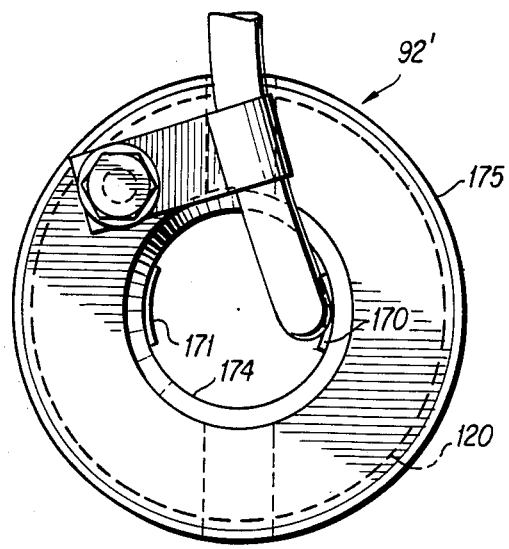
FIG. 6A is a top view of a wrist pin according to an embodiment of the invention wherein shear stress sensors are mounted on an interior surface of the wrist pin.
Figure 6B:
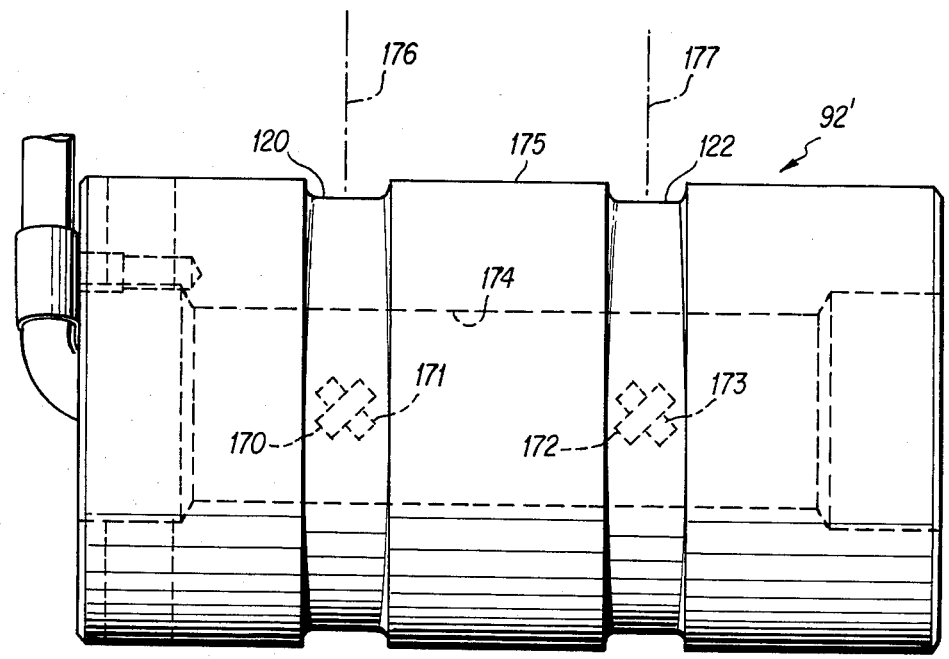
FIG. 6B is an end view of the wrist pin of FIG. 6A.

FIGS. 6A and 6B show an embodiment of a wrist pin 92' which resembles the wrist pin 92 of the embodiment of FIGS. 3 and 5 but wherein strain gage sensors 170, 171, 172 and 173 are mounted on an interior cylindrical surface 174. Strain gages 170 and 171 are mounted to lie in shear plane 176; strain gages 172 and 173 are mounted to lie in shear plane 177. The wrist pin 92' does have annular recesses 120,122 provided on its exterior surface, but does not have passageways as employed in the wrist pin 92.

Figure 7A:
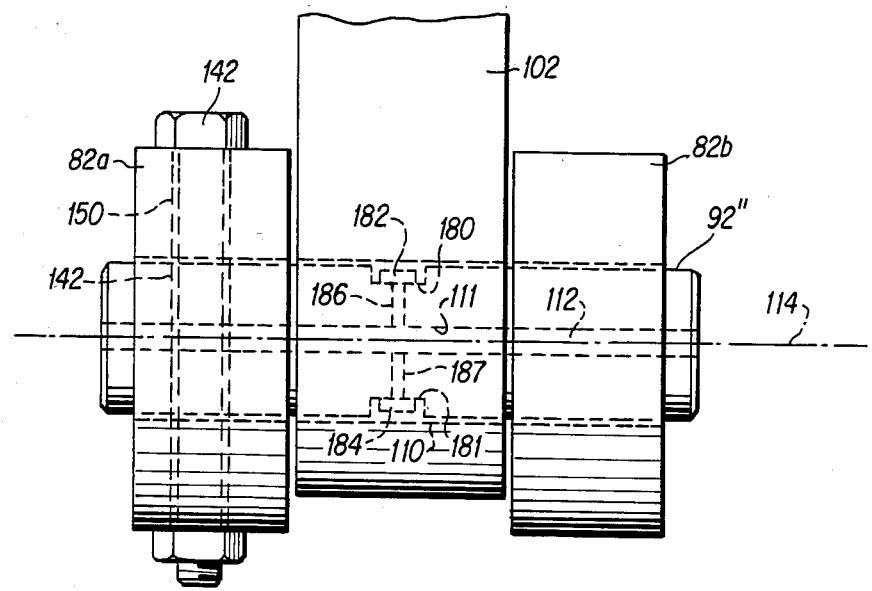
FIG. 7A is a top view of a wrist pin according to an embodiment of the invention, the wrist pin being engaged between plunger hubs and having a connecting rod bearing housing disposed thereabout.
Figure 7B:
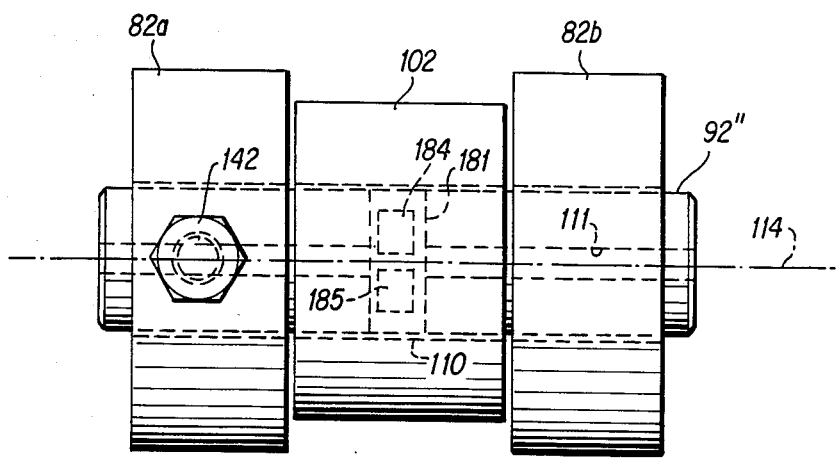
FIG. 7B is a front view of the wrist pin of the embodiment of FIG. 7A.

FIGS. 7A, and 7B show an embodiment of a wrist pin 92" having sensors mounted thereon in a bending plane. Like wrist pin 92 of FIGS. 3 and 5, the wrist pin 92" is essentially a hollow cylinder with exterior and interior surfaces. Hence, to the extent the wrist pins 92 and 92" have analogous structural features, similar reference numerals are used with respect to such features.

Rather than having two annular recesses, the wrist pin 92" two flat portions 180, 181 formed along an intermediate portion of the major axis 114 of wrist pin 92". Flat portion 180 is formed on the back of wrist pin 92" and flat portion 181 is formed on the front of wrist pin 92". The flat portions 180, 181 are chordal flat surfaces machined at a midpoint along the major axis 114 of the wrist pin 92". Two bending stress sensors such as strain gages are mounted on each chordal flat portion—one above the other seen from the front. Thus, strain gages 182 and 183 are mounted on the back chordal flat portion 180; strain gages 184 and 185 are mounted on the front chordal flat portion 181. In like manner as described with regard to the embodiments of FIGS. 3 and 5, passageways 186 and 187 accommodate the electrical wires extending from the strain gage pairs 182, 183 and 184, 185, respectively, to the interior cavity 112.

The wrist pin 92" of the embodiment of FIG. 7 is assembled in much the same manner of the embodiment of FIGS. 3 and 5. However, the strain gages are mounted about a bending plane which is perpendicular to the plane of the sheet of FIG. 7B and has axis 114 lying therein. The chordal flat surfaces 180 and 181 are machined on the wrist pin 92" and strain gage pairs 182, 183 and 184, 185, respectively, mounted thereon in a manner whereby the strain gages in each pair lie on opposite sides of the bending plane.

Figure 8:
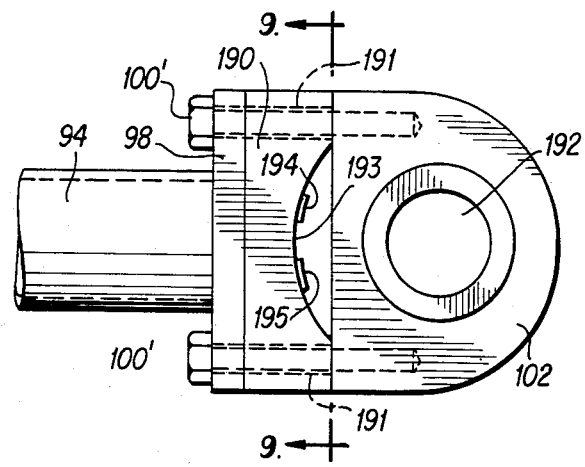
FIG. 8 is a side view of a load cell connected between connecting rod weld assembly and a wrist pin bearing housing; and, FIG. 9 is a sectional view of the load cell of the embodiment of FIG. 8 taken along the line 9—9.
Figure 9:
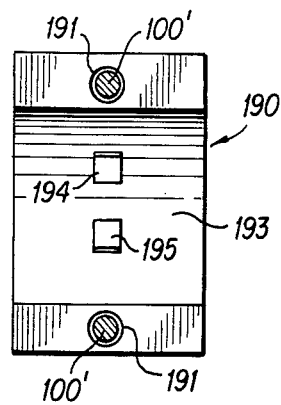

FIGS. 8 and 9 show an embodiment of the invention wherein a load cell 190 is mounted between the plate 98 and the bearing housing 102. The load cell has two bores 191 therein to receive fasteners 100' so that the load cell 190 can effectively be sandwiched between the plate 98 and the bearing housing 102. A wrist pin 192 which does not have a sensor mounted thereon extends through the bearing contained in bearing housing 102 and between two plunger hubs comprising a plunger hub pair such as those described above.

The load cell 190 has an arcuate surface 193 formed thereon, in particular the surface which faces the bearing housing 102. The arcuate surface 193 has two stress sensors 194 and 195 mounted thereon, one above the other as seen from the side in FIG. 8. The sensors 194, 195 senses stress experienced by the arcuate surface during the application of a compactive force applied by the plunger means and produce electrical signals in accordance with the sensed stress. In one embodiment the sensors 194 and 195 are bending stress sensors.

In operation a charge of crop material is fed from feed chamber 24 through inlet opening 36 into the bale case 20. The plunger assembly 22, actuated by the plunger drive means 70, is driven toward the rightward direction as shown in FIG. 1 to apply a compactive force on crop material in the bale case 20. The stress experienced upon compaction by the connecting means 72 which connects the plunger element 71 to the driving means 70 is sensed and an electrical signal generated in accordance with the sensed stress. The electrical signal is used for the generation of a control signal which is applied to the tension adjusting system 60, particularly to the servo valve 61, in order to change the tension applied to the rails 54, 56 of the bale case 20, thereby changing the degree of resistance to the movement of crop material introduced into the bale case 20 (and thereby controlling the density of the crop material being baled therein). Under certain circumstances, the dimensions of the bale case 20 are changed in order to control the density of crop material being baled therein.

In the above regard, with respect to the embodiment of FIGS. 3 and 5, shear stress is experienced by the wrist pin 92 comprising the connecting means 72 in shear planes 160A, 160B. Sensors 124, 126, 128, and 130, connected in the bridge configuration of FIG. 4, produce an output signal which is applied to sensor drive and output circuitry such as that shown in U.S. patent application Ser. No. 773,472 simultaneously filed herewith by Richard P. Strosser and entitled "Electronic Bale Density Controller". With respect to the embodiment of FIGS. 6, shear stress is experienced by the wrist pin 92' in shear planes 176 and 177 whereby sensors 170, 171, 172, and 173, connected in a bridge configuration like that of FIG. 4, produce an output signal which is also applied to sensor drive and output circuitry. With respect to the embodiment of FIGS. 7, bending stress experienced by the wrist pin 92" in the bending plane and sensed by sensors 182, 183 and 184, 185 which produce an output signal for application to sensor drive and output circuitry. With respect to the embodiment of FIGS. 8 and 9, the stress experienced by the arcuate surface 193 of load cell 190 is sensed by sensors 194, 195 which produce an output signal for application to sensor drive and output circuitry.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. Apparatus for controlling the density of bales of crop material discharged from an agricultural baling machine, said apparatus comprising:
   a bale case into which crop material is introduced;
   means for providing resistance to the movement of crop material through said bale case;
   plunger means disposed for reciprocating movement in said bale case;
   means for reciprocably driving said plunger means in a manner whereby said plunger means applies a compactive force to crop material introduced into said bale case and thereby facilitates movement of said crop material through said bale case;
   means for connecting said plunger means to said plunger driving means, said connecting means comprising:
   a wrist pin mounted on said plunger means; and,
   a connecting rod assembly having a first end connected to said plunger driving means and a second end connected to said wrist pin;
   means for sensing the stress experienced by said wrist pin during the application of said compactive force applied by said plunger means and for producing an electrical signal in accordance with said sensed stress; and,
   means for adjusting in response to said electrical signal the degree of resistance to said crop material movement through said bale case.

2. The apparatus of claim 1, wherein said wrist pin has a major axis, wherein said second end of said connecting rod assembly is connected to said wrist pin along an intermediate portion of said major axis, wherein the location of said second end of said connecting rod assembly defines two shear planes of said wrist pin, said shear planes being essentially perpendicular to said major axis of said wrist pin, and wherein said sensing means comprises shear stress sensors mounted on said wrist pin in each of said shear planes.

3. The apparatus of claim 2, wherein said sensors are strain gages.

4. The apparatus of claim 2, wherein said wrist pin has two channels formed on an exterior surface thereof with sensors mounted in each of said channels in a manner whereby said sensors are mounted in a shear plane.

5. The apparatus of claim 4, wherein said wrist pin is essentially cylindrical and wherein said channels are essentially annular recesses, and wherein two shear stress sensors are mounted in each recess, said sensors being mounted essentially 180 degrees apart about said major axis.

6. The apparatus of claim 4, wherein said wrist pin has an interior surface which defines a cavity in said wrist pin, and wherein a passageway is provided between said exterior surface and interior surface of said wrist pin to accommodate electrical lines connected to said sensors.

7. The apparatus of claim 2, wherein said wrist pin has an interior surface which defines a cavity extending along the major axis of said wrist pin, and wherein said sensors are mounted on said interior surface in a manner whereby each shear plane has at least one sensor lying therein.

8. The apparatus of claim 2, wherein two shear stress sensors are mounted in each of said shear planes, a first of said shear planes having first and second sensors mounted therein and a second of said shear planes having third and fourth sensors mounted therein, said sensors being electrically connected in a bridge configuration whereby:
   (1) said first and second sensors are connected to have a common drive signal applied to respective input terminals thereof;
   (2) said third and fourth sensors are connected to have a common drive signal applied to respective input terminals thereof;
   (3) output terminals of the first and third sensors are connected together; and,
   (4) output terminals of the second and fourth sensors are connected together to produce an electrical output signal indicative of said sensed stress.

9. The apparatus of claim 1, wherein said sensing means comprises means for sensing the bending stress experienced by said wrist pin during the application of said compactive force by said plunger means.

10. The apparatus of claim 9, wherein said wrist pin has a major axis, wherein said second end of said connecting rod is connected to said wrist pin along an intermediate portion of said major axis, wherein the location of said second end of said connecting rod assembly defines a bending stress plane of said wrist pin, said bending stress plane being essentially perpendicular to said major axis of said wrist pin, and wherein said sensing means comprises two bending stress sensors mounted on said wrist pin in said bending stress plane.

11. The apparatus of claim 10, wherein said wrist pin is essentially cylindrical, wherein said wrist pin has a chordal flat surface formed on its exterior cylindrical surface, and wherein said bending stress sensors are mounted on said chordal flat surface in a manner whereby said bending stress plane passes through said sensors.

12. The apparatus of claim 11, wherein said wrist pin has an interior surface which defines a cavity in said wrist pin, and wherein a passageway is provided between said exterior surface and interior surface of said wrist pin to accommodate electrical lines connected to said sensors.

13. The apparatus of claim 1, wherein said means for changing the degree of resistance to crop movement through said bale case comprises means for adjusting a dimension of said bale case.

14. Apparatus for controlling the density of bales of crop material discharged from an agricultural baling machine, said apparatus comprising:
 a bale case into which crop material is introduced;
 means for providing resistance to the movement of crop material through said bale case;
 plunger means disposed for reciprocating movement in said bale case;
 means for reciprocably driving said plunger means in a manner whereby said plunger means applies a compactive force to crop material introduced into said bale case and thereby facilitates movement of crop material through said bale case;
 means for connecting said plunger means to plunger drive means;
 a stress load cell connected to said connecting means, said stress load cell having an arcuate surface which experiences a during the application of said compactive force by said plunger means;
 sensing means mounted on said arcuate surface of said load cell for sensing the stress experienced by said arcuate surface during the application of said compactive force applied by said plunger means and for producing an electrical signal in accordance with said sensed stress; and,
 means for adjusting in response to said electrical signal the degree of resistance to said crop material movement through said bale case.

15. The apparatus of claim 14, wherein said sensing means comprises a bending stress sensor mounted on said arcuate surface.

16. The apparatus of claim 15, wherein said bending stress sensor comprises two strain gages.

17. The apparatus of claim 14, wherein said means for changing the degree of resistance to crop movement through said bale case comprises means for adjusting a dimension of said bale case.

18. A method for controlling the density of bales of crop material discharged from an agricultural baling machine, said method comprising the steps of:
 introducing crop material into a bale case;
 reciprocably driving plunger means disposed in said bale case in a manner whereby said plunger means applies a compactive force to crop material introduced into said bale case, said plunger means being connected to plunger driving means by connecting means comprising a wrist pin mounted on said plunger means and a connecting rod assembly having a first end connected to said plunger driving means and a second end connected to said wrist pin;
 sensing the stress experienced by said wrist pin during the application of said compactive force applied by said plunger means and for producing an electrical signal in accordance with said sensed stress; and,
 adjusting in response to said signal the degree of resistance to the movement of crop material through said bale case and thereby controlling the density of bales of crop material being discharged therefrom.

19. The method of claim 18, wherein said step of sensing the stress experienced by said wrist pin comprises the step of sensing the shear stress experienced by said wrist pin in two shear planes, said shear planes of said wrist pin being defined by the location of said second end of said connecting rod assembly and being oriented essentially orthogonally to a major axis of said wrist pin.

20. The method of claim 18, wherein said step of sensing the stress experienced by said wrist pin comprises the step of sensing the bending stress experienced by said wrist pin during the application of said compactive force by said plunger means.

21. The method of claim 18, wherein said step of adjusting the degree of resistance to the movement of crop material comprises the step of adjusting a dimension of said bale case.

22. A method for controlling the density of bales of crop material discharged from an agricultural baling machine, said method comprising the steps of:
 introducing crop material into a bale case;
 reciprocably driving plunger means disposed in a forward portion of said bale case in a manner whereby said plunger means applies a compactive force to crop material introduced into said bale case, said plunger means being connected to plunger driving means by connecting means;
 connecting a stress load cell to said connecting means, said stress load cell having an arcuate surface which experiences a stress during the application of said compactive force by said plunger means;
 sensing the stress experienced by said arcuate surface of said load cell during the application of said compactive force applied by said plunger means and producing an electrical signal in accordance with the said sensed stress; and,
 adjusting in response to said signal the degree of resistance to the movement of crop material through said bale case and thereby controlling the density of bale of crop material being discharged therefrom.

23. The method of claim 22, wherein said step of adjusting the degree of resistance to the movement of crop material comprises the step of adjusting a dimension of said bale case.

24. Apparatus for controlling the density of bales of crop material discharged from an agricultural baling machine, said apparatus comprising:
   a bale case into which crop material is introduced;
   means for providing resistance to the movement of crop material through said bale case;
   a plunger element disposed for reciprocating movement in said bale case;
   means for reciprocably driving said plunger element in a manner whereby said plunger element applies a compactive force to crop material introduced into said bale case and thereby facilitates movement of said crop material through said bale case;
   means for connecting said plunger element to said plunger driving means;
   means for sensing the stress experienced by said connecting means during the application of said compactive force applied by said plunger element and for producing an electrical signal in accordance with said sensed stress; and,
   means for adjusting in response to said electrical signal the degree of resistance to said crop material movement through said bale case.

25. The apparatus of claim 24, wherein said connecting means has a first end connected to said plunger drive means and a second end connected to said plunger element, and wherein said sensing means is positioned proximate one of said ends of said connecting means.

26. The apparatus of claim 25, wherein said sensing means comprises a plurality of sensors mounted with respect to a stress plane lying proximate one of said ends of said connecting means.

27. The apparatus of claim 26, wherein said sensors are mounted in a shear stress plane lying proximate one of said ends of said connecting means.

28. The apparatus of claim 26, wherein said sensors are mounted about a bending stress plane lying proximate one of said ends of said connecting means.

29. The apparatus of claim 26, wherein said sensors are strain gages.

30. A method for controlling the density of bales of crop material discharged from an agricultural baling machine, said method comprising the steps of:
   introducing crop material into a bale case;
   reciprocably driving a plunger element disposed in said bale case in a manner whereby said plunger element applies a compactive force to crop material introduced into said bale case, said plunger element being connected to plunger driving means by connecting means;
   sensing the stress experienced by connecting means during the application of said compactive force applied by said plunger means and for producing an electrical signal in accordance with said sensed stress; and,
   adjusting in response to said signal the degree of resistance to the movement of crop material through said bale case and thereby controlling the density of bales of crop material being discharged therefrom.

31. The method of claim 31, wherein said connecting means has a first end connected to said plunger drive means and a second end connected to said plunger element, and wherein said method further comprises the step of mounting a plurality of sensors comprising said sensor means with respect to a stress plane lying proximate one of said ends of said connecting means.

32. A method for controlling the degree of stress experienced by connecting means which connects a plunger element to plunger drive means of an agricultural baling machine, said method comprising the steps of:
   introducing crop material into a bale case comprising said machine;
   reciprocably driving said plunger element disposed in said bale case in a manner whereby said plunger element applies a compactive force to crop material introduced into said bale case, said plunger element being connected to plunger driving means by said connecting means;
   sensing the stress experienced by connecting means during the application of said compactive force applied by said plunger means and for producing an electrical signal in accordance with said sensed stress; and,
   adjusting in response to said signal the degree of resistance to the movement of crop material through said bale case and thereby controlling the degree of stress experienced by said connecting means.

33. The method of claim 32, wherein said connecting means has a first end connected to said plunger drive means and a second end connected to said plunger element, and wherein said method further comprises the step of mounting a plurality of sensors comprising said sensor means with respect to a stress plane lying proximate one of said ends of said connecting means.

* * * * *